Figure 1:
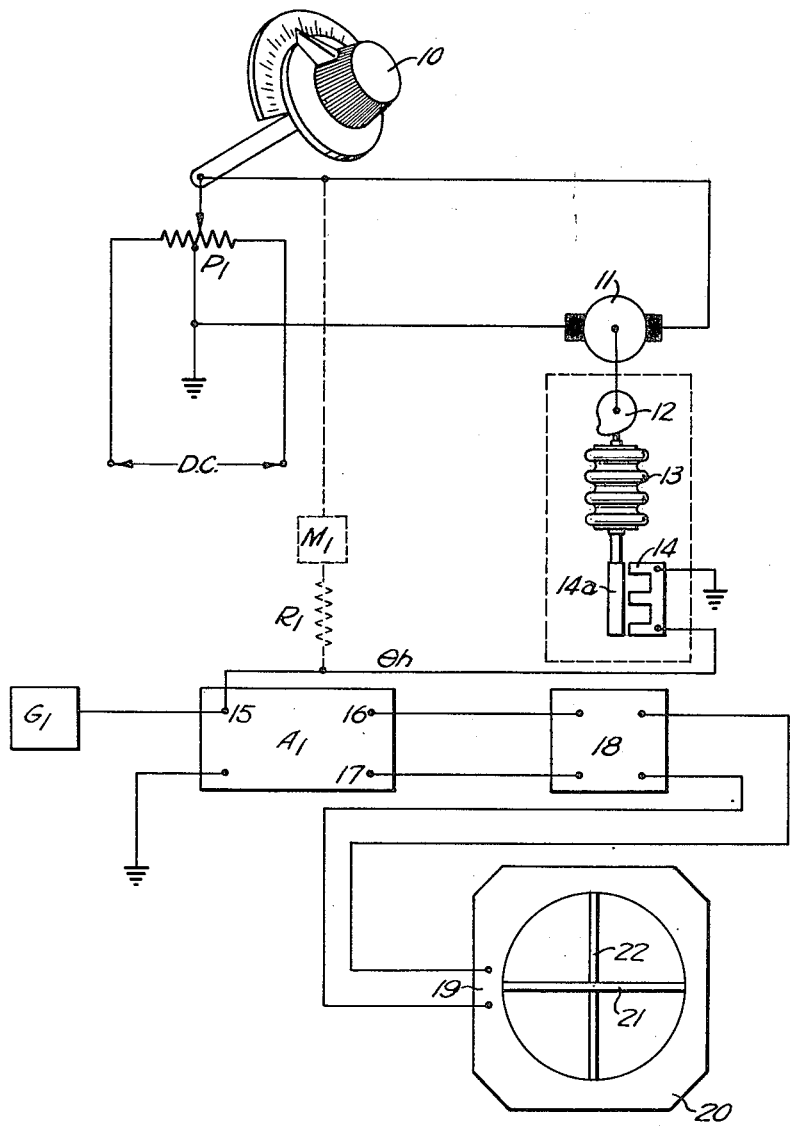

Sept. 11, 1956 H. B. SEDGFIELD 2,762,993
AIRCRAFT NAVIGATIONAL AID APPARATUS
Filed March 31, 1954 2 Sheets-Sheet 1

INVENTOR
HUGH B. SEDGFIELD
BY
Herbert H. Thompson
ATTORNEY

Sept. 11, 1956     H. B. SEDGFIELD     2,762,993
AIRCRAFT NAVIGATIONAL AID APPARATUS
Filed March 31, 1954     2 Sheets—Sheet 2

INVENTOR
HUGH B. SEDGFIELD
BY
Herbert H. Thompson
ATTORNEY

United States Patent Office 2,762,993
Patented Sept. 11, 1956

2,762,993

AIRCRAFT NAVIGATIONAL AID APPARATUS

Hugh Brougham Sedgfield, Oakfield, Hampton, England, assignor to The Sperry Gyroscope Company Limited, Brentford, England, a British company Application March 31, 1954, Serial No. 420,175

Claims priority, application Great Britain April 24, 1953

5 Claims. (Cl. 340—27)

This invention relates to navigational aid apparatus for assisting the pilot of an aircraft in controlling his craft in pitch.

It is normal practice to provide on an aircraft some means of measuring or indicating the craft's attitude in pitch, so that the pilot does not have to rely on visual observation of the ground in order to determine the manner in which he should operate the controls which affect the craft's attitude in pitch.

It is also common practice to provide some indication of the height of the craft, and, to assist the pilot in maintaining his craft in level flight, it has been proposed that an instrument should be provided to indicate departure from a predetermined height.

It has also been proposed that the indications provided by a pitch-indicating instrument should be modified in dependence on departure of the craft from a predetermined height. Apparatus that may be considered to perform this function is described in our patent U. S. Patent No. 2,613,350 to Spencer Kellogg, Jr., dated October 7, 1952, for Flight Indicating System for Dirigible Craft. This apparatus, which may be termed a flight director, enables information about the craft's departure from certain types of predetermined flight path in both elevation and azimuth to be displayed on a single cross-pointer indicator. Under certain conditions the horizontal pointer, that is the pointer that gives information about departure from the flight path in elevation, is controlled in dependence on a resultant signal that is produced by the algebraic combination of a primary signal measuring departure of the aircraft from a predetermined pitch inclination and a secondary signal measuring departure of the aircraft from a predetermined height. In another possible arrangement the elevation information is provided on an instrument in which a pointer is controlled difference between the actual height of the aircraft and a height computed from a set input value representing a desired rate of climb or dive, the indication being utilised to control the aircraft and cause it to make the desired rate of climb or dive.

The invention also consists in navigational aid apparatus for assisting the pilot of an aircraft to maintain a desired rate of climb or dive in which indications of the pitch angle of the aircraft are modified in dependence on the difference between the rate of change of the actual height of the aircraft and a set input value representing the desired rate of climb or dive.

The invention also consists in navigational aid apparatus for aircraft comprising an indicating instrument, pitch responsive means for providing a primary signal measuring the departure of the aircraft from a predetermined pitch inclination; means for providing a secondary signal measuring the difference between the actual height of the aircraft and a value of the height computed from a set input value representing a desired rate of climb or dive; means for algebraically combining the primary and secondary signals to produce a resultant signal; and means for controlling the indicating instrument, at least in part, in dependence on the resultant signal.

The invention also consists in navigational aid apparatus according to the preceding paragraph in which the indicating instrument is also controlled in dependence on the set input value representing the desired rate of climb or dive.

The computed value for the height may be obtained by setting up a control voltage proportional to the desired rate of change of height of the aircraft and using this control voltage to drive an electric motor and the shaft of which rotates in dependence on the primary signal and the zero index of the instrument is controlled in dependence on the secondary signal, so that the position of the pointer relative to the index depends on the difference between the primary and secondary signals.

Thus in aircraft equipped with apparatus of the type described in the preceding paragraph the pilot is able to control his craft so that it flies at a constant height without having to combine mentally information given by a pitch-responsive instrument and an altimeter. The information provided by these two instruments is combined and presented to the pilot so that he has only to control his craft to maintain the pointer of the indicator at the null or zero position. If the aircraft departs from the predetermined height the indicator shows the pilot the sense and amount of control that he must apply to bring the air craft back to the required height. As the system combines the information for the pilot prior to the presentation of the indicator the pilot is relieved of the necessity of combining the information mentally.

Whilst this apparatus assists the pilot to maintain his craft in level flight, it does not provide information that is of direct assistance to him if he desires to control his craft so that it travels with a predetermined rate of climb or dive. Accordingly the object of the present invention is to provide navigational aid apparatus for assisting the pilot to control his aircraft to maintain a desired rate of climb or dive.

According to the present invention there is provided aircraft navigation apparatus for enabling a desired rate of climb or dive of an aircraft to be executed comprising an indicating instrument, manually settable means for setting a desired rate of climb or dive and adapted to produce a signal corresponding to said setting means responsive to said rate of climb or dive signal adapted to provide an altitude deviation signal that is a measure of the difference between a continuously changing set altitude and the actual altitude, pitch deviation responsive means for providing a signal that is a measure of the pitch deviation of the aircraft and means for combining said altitude deviation signal and said pitch deviation signal and for supplying said combined signal to cause the indicating instrument to provide an indication dependent on the combined signal.

The invention also consists in aircraft navigation apparatus for enabling a desired rate of climb or dive of an aircraft to be executed comprising an indicating instrument having an indicator displaceable from a zero reference, manually settable means for setting a desired rate of climb or dive and adapted to produce a signal corresponding to said setting, means responsive to said rate-of-climb or dive signal adapted to provide an altitude-deviation signal that is a measure of the difference between a continuously changing set altitude and the actual altitude, pitch-deviation-responsive means for providing a signal that is a measure of the pitch deviation of the aircraft, and means for combining said altitude-deviation signal and said pitch-deviation signal and for supplying said combined signal to control the indicator.

The invention also consists in navigational aid apparatus according to either of the two preceding paragraphs in which the indicating instrument is also controlled in dependence on the signal representing the desired rate of climb or dive.

Figure 2:
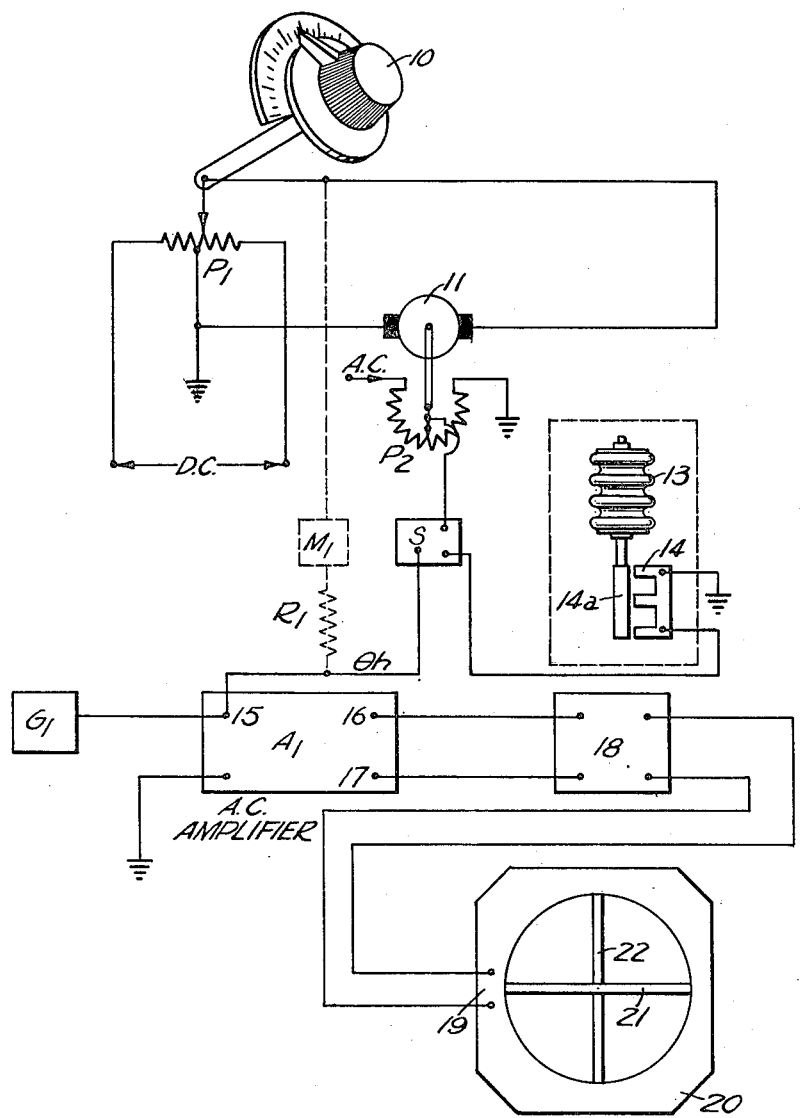

The invention will be more easily appreciated from the following description of two embodiments of the invention reference being had to the figures of the accompanying drawing. Fig. 1 shows a schematic diagram of a flight director and its attendant electrical circuit using a mechanical comparison of actual and desired height while Fig. 2 shows a similar scheme with an electrical comparison of actual and desired height.

Referring now specifically to Figure 1 it will be seen that the pilot of the aircraft is provided with a control knob 10 on which he is able to set in a desired rate of climb or dive. The control 10 positions the wiper arm 10a of a potentiometer P1 which has its winding connected across a D. C. source so that the sense and magnitude of the voltage between the said wiper arm and the centre point M is a measure of the sense and magnitude of the desired rate of change of height of the aircraft. This voltage is used to drive an integrating motor 11 whose shaft rotates at a speed substantially proportional to the voltage applied to it. A cam 12 on the shaft of the integrating motor 11 positions one end of a barometric capsule 13, which, at that end, is mounted on a leaf spring (not shown) which always maintains the end of the capsule against the cam 12 the other end of which carries one element 14a of a pick-off 14 connected across an A. C. source (not shown). The cam 12 may have a non-linear law to compensate for non-linearity in the capsule characteristic. In addition we may arrange for the shaft of the motor 11 to drive a potentiometer (not shown) which is used to modify the output of the pick-off 14 and thereby vary the sensitivity of the system when the craft is at different altitudes. Change of height causes the capsule 13 either to expand or to contract and the system is so arranged that the cam 12 drives the bellows in a direction opposite to the said expansion or contraction.

An output error signal $\theta_h$, derived from the pick-off 14, is a signal measuring the difference between the actual height and the computed or desired height of the aircraft and it is fed to the live input terminal 15 of a mixing amplifier A1 of a flight director system. The voltage on wiper arm 10a of the potentiometer P1 is also fed through a modulator M1 and resistor R1 to a live input terminal 15 of the amplifier A1. A pitch deviation signal from the gyrovertical G1 is also supplied to the amplifier A1 to be combined with the other signal. Other signals are also fed to the amplifier A1, namely, the vertical gyro pitch signal G1 and a radio signal, not shown, such as the signal for I. L. S. glide path.

The output of the mixing amplifier A1 from terminals 16, 17 is fed to a phase-sense-sensitive rectifier 18 which provides an output in the form of a D. C. voltage that is dependent in magnitude and polarity on the algebraic sum of the various control quantities applied to the said mixing amplifier. The output of the phase-sense-sensitive rectifier 18 is fed to one of the operating coils 19 of the cross pointer centre-zero indicating instrument 20 in such a way that the pointer 21 is in its zero position when the algebraic sum of the control quantities supplied to the input terminals of the mixing amplifier A1 is zero, indicating that the aircraft is following the desired path to climb or dive the desired rate. The signals controlling the vertical pointer 22 are not considered here as they are not relevant to the discussion of the present invention.

The operation is as follows. When the pilot's setting control knob 10 is set for level flight, the integrating motor 11 is stationary and consequently the output of the pick-off 14 is a measure of the departure of the aircraft from the computed height (the height datum) at the time when the control 10 was set to this position. Under these conditions the apparatus behaves in precisely the same way as that described in the specification of our Patent No. 2,613,350 and thereby assists the pilot to maintain his aircraft in level flight.

If now the pilot sets in on the control 10 a rate of climb or dive other than zero, the horizontal pointer 21 of the centre-zero indicating instrument 20 is at first displaced from the zero position by an amount and in a direction that depends on the magnitude and sense of the said set rate of dive or climb. The pilot then operates the controls of the aircraft until the pointer 21 is brought back to its zero position, that is, until the signal supplied to the amplifier A1 from the potentiometer P1 is matched by the signal from the gyro vertical G1. As a result of this control by the pilot, the aircraft dives or climbs at approximately the desired rate, but probably at not exactly the rate corresponding to the setting of the pilot's control 10. As a result, after a time there will be an appreciable difference between the actual height given by the barometric capsule 13 and the desired height derived from the integrating motor 11. Consequently an error signal $\theta_h$ will be fed from the pick-off 14 to the mixing amplifier A1 which will operate to move the pointer 21 in such a direction that the pilot in controlling his craft to return the pointer 21 to zero, will make the new rate of dive or climb more nearly equal to the set rate of dive or climb.

It will be appreciated that the system shown in Fig. 1 would operate satisfactorily if the set input value via M1, R1 was omitted. For this reason the connection is shown by a broken line. The operation would then be as follows:

When the pilot's setting control 10 is set for level flight, the intergrating motor 11 is stationary and the output of the pick-off 14 is a measure of the departure of the craft from the computed height at the time when the control 10 was set to this position. If now the pilot sets in on the control 10 a rate of climb or dive other than zero the shaft of the integrating motor 11 rotates, and the cam 12 drives the end of the barometric capsule 13 and a signal is derived from the pick-off 14 which is fed to the amplifier A1. This signal is matched by the signal from G1 when the pilot changes the attitude of the craft in pitch to bring the pointer 21 on to the zero position. Consequently the craft is made to climb at the rate demanded on the control 10 without the use of the signal along the channel that includes the modulator M1 and the resistor R1 but this means that throughout the climb or dive the pick-off device 14 will continuously have to apply an output that matches the signal from the vertical gyroscope G1 and the desired rate of climb or dive will not be attained as quickly as in the alternative case.

Referring now to Fig. 2 where integers identical with those of Fig. 1 have the same reference numbers and letters, it will be seen that the integrating motor 11 has its shaft arranged to drive the arm of an A. C. potentiometer P2. The voltage derived from P2 is a measure of the desired height and this voltage is fed to an electrical substraction unit, shown generally at S. The voltage derived from the pick-off 14 is, however, a measure of actual height and this voltage is also fed to the subtraction unit S. The resultant voltage derived from S is fed to the input terminal 15 of the amplifier A1. In this way an electrical comparison of computed and actual height is provided. The operation of the system is mutatis mutandis not dissimilar to that discussed in detail for the embodiment shown in Fig. 1.

When initially setting the system into operation the knob 10 is adjusted so as to cause the motor 11 to rotate until the signal produced from the pick-off P2 matches the signal from the pick-off device 14 at a desired altitude. The knob 10 is then centralized and the system will operate in the manner of the system of the prior patent 2,613,350 so that by maintaining the pointer 21 at the zero reference the aircraft will be maintained at the desired altitude. Various rates of climb or dive away from this altitude may then be obtained by suitable setting of the knob 10 as previously described.

Since many changes could be made in the above construction and many apparently widely different embodiments of this invention would be made without departing from the scope thereof, it is intended that all matter contained in the above description or shown in the accompanying drawings, shall be interpreted as illustrative and not in a limiting sense.

I claim:

1. A visible navigating instrument for aircraft comprising a horizontal indicator having a normally central or zero position, indicating by its position above and below its zero position that the aviator should move his elevator to cause ascent or descent of the craft, means for moving the same up and down, and a composite signal for actuating said means for so moving said indicator, including a manually settable climb or dive device adapted to be set to call for a climb or dive at a desired rate of change of altitude and giving a signal proportional to its setting, a barometric device producing a signal proportional to the error in altitude and a gyroscopic attitude maintaining device producing a signal proportional to the attitude departure of the craft from level, all of said last three signals being combined to produce said composite signal which controls said horizontal indicator such that said indicator reads zero not only when the craft is flying level at the desired altitude but is ascending or descending at the rate set by said settable device.

2. A visible navigating instrument for aircraft comprising a horizontal indicator movable up and down and having a normally zero position and indicating by its position above and below its zero position that the aviator should move elevator controls to cause ascent or descent of the craft, a settable rate of climb or descent device, means for so moving said indicator including an electromotive means controlled by the following control terms; one proportional to the pitch attitude of the craft, another proportional to the error in the desired height of the craft ($\theta_h$), and a third settable by said device in proportion to the desired rate of climb or dive; whereby the pitch angle of the craft is indicated by the said indicator as zero not only when the aircraft is flying level at the desired altitude but when it is ascending or descending at a preset rate.

3. An aircraft navigating indicator as claimed in claim 2, in which said height error and rate of climb and dive terms include a barometric capsule having a pick-off varied with the expansion and contraction thereof, said motive means causing variation in the position of said capsule at a rate set by said setting device.

4. Aircraft navigation apparatus for enabling a desired rate of climb or dive of an aircraft to be executed comprising an indicating instrument having an indicator displaceable from a zero reference, manually settable means for setting a desired rate of climb or dive and adapted to produce a signal corresponding to said setting, means actuated thereby providing an altitude-deviation signal that is a measure of the difference between an altitude which is changing continuously at the rate set and the actual altitude, pitch-deviation-responsive means for providing a signal that is a measure of the pitch deviation of the aircraft and means for combining said altitude-deviation signal and said pitch-deviation signal and for supplying said combined signal to control the indicator.

5. Aircraft navigation apparatus as claimed in claim 4, wherein the means for providing the altitude-deviation signal comprises a barometric device having an associated pick-off device which is to provide a measure of the actual altitude of the aircraft and a signal generator, such as a potentiometer, conected to be controlled by a motor that is adapted to be energized by the said rate-of-climb-or-dive signal so as to be driven at a speed proportional to the signal so that the signal generator provides, at an instant, a signal that is a measure of a set altitude.

References Cited in the file of this patent

UNITED STATES PATENTS 2,663,008     McEwan _____ Dec. 15, 1953